2,845,144

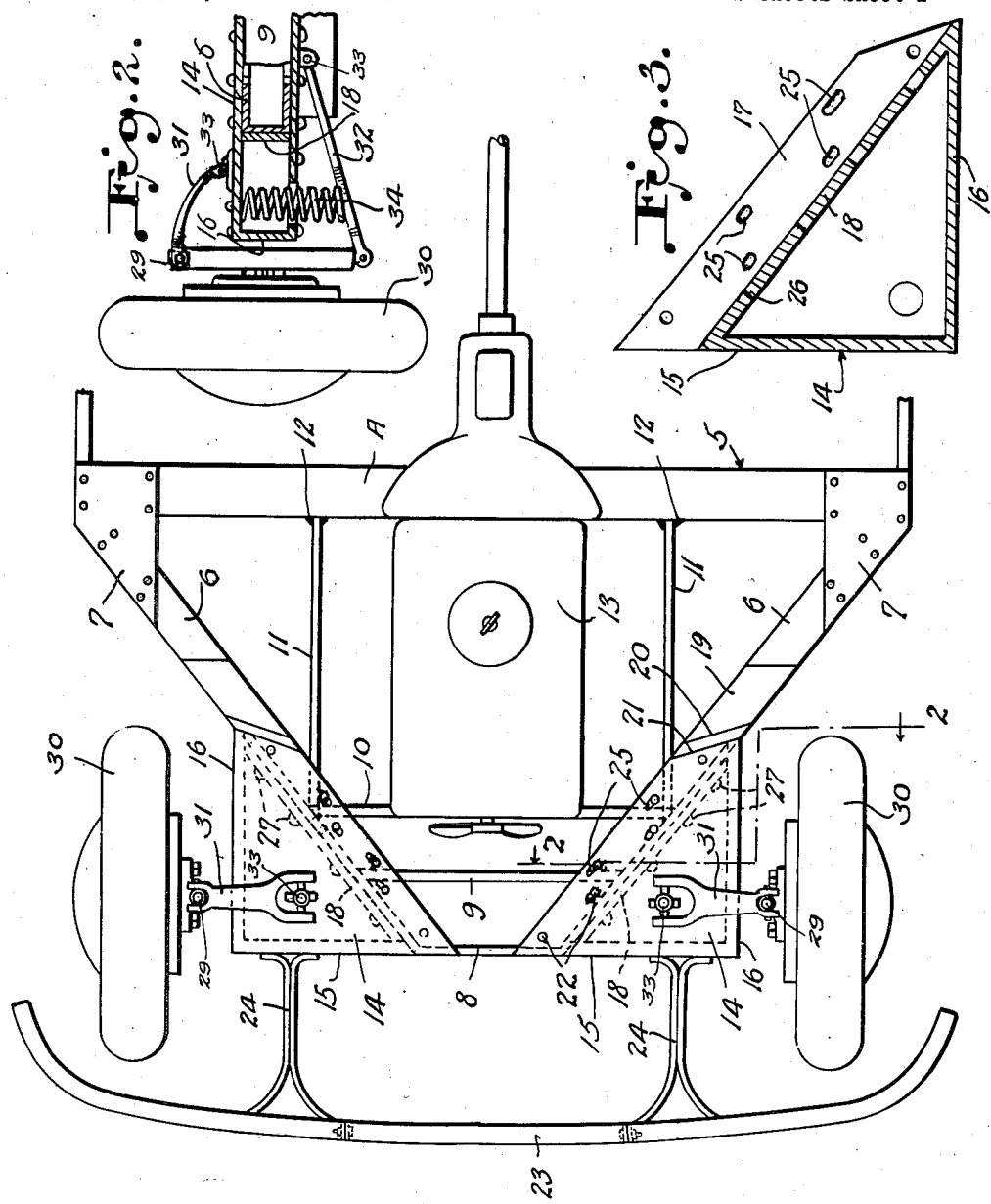

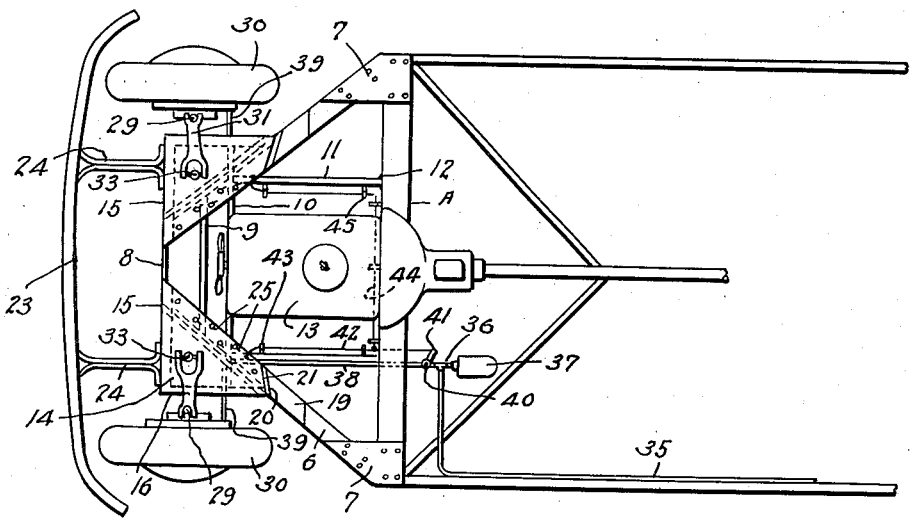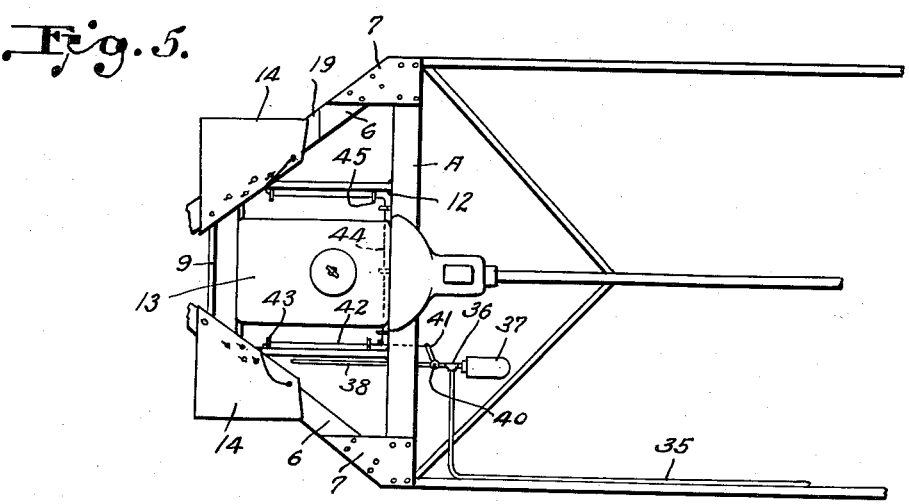

SHEAR PIN BRAKE FOR AUTO BUMPERS

Frank W. Bohn, Scranton, Pa.

Application February 16, 1956, Serial No. 565,877

2 Claims. (Cl. 188—1)

This invention relates to motor vehicle frame construction, the primary object of the invention being to provide a motor vehicle frame which will dissipate and reduce the force of the impact directed to the frame of a vehicle incident to a vehicle striking another vehicle, or other object, and consequently reducing the chances of injury to the occupants of the vehicle.

Another object of the invention is to provide a vehicle frame which is so constructed that a head-on force directed to the front of the vehicle will be shunted laterally and transformed from what would ordinarily be a direct force, into a a glancing force, thereby substantially reducing damage as a result of a head-on collision.

Still another object of the invention is to provide shear plates to which the bumper of the vehicle is secured, which plates are secured to the frame of a motor vehicle in such a way as to withstand normal forces encountered, but which will become automatically detached from the body under an excessive force directed to the bumper, resulting in a glancing blow directed to the vehicle frame.

Other and further objects and advantages of the invention will be hereinafter described and the novel features thereof defined in the appended claims.

Referring to the drawing:

Fig. 1 is a plan view of the front end of a motor vehicle equipped with bumper plates and supporting frame constructed in accordance with the invention.

Fig. 2 is a sectional view taken on line 2—2 of Fig. 1.

Fig. 3 is a horizontal sectional view taken through one of the frame members.

Fig. 4 is a plan view of the front end of a motor vehicle equipped with means for automatically closing the brake fluid line in case of a collision.

Fig. 5 is a plan view illustrating the means for cutting off the brake fluid line, as actuated.

Referring to the drawing in detail, the reference character 5 indicates a transverse bar of a motor vehicle chassis, which is connected with the forwardly extended bars 6 of the chassis, by means of the plates 7, the bars 6 converging towards the front of the vehicle frame, as better shown by Figure 1 of the drawing.

Spaced transverse bars 8 and 9 connect with the bars 6 at the front end of the chassis, which bars 8 and 9 hold the bars 6 in proper spaced relation with respect to each other.

The bars 6 are further braced by means of a transverse bar 10 that in turn is connected with the horizontal bars 11 that have their rear ends welded to the bar 5 at 12, the bar 10 provides a support for the forward end of the motor 13, which is of the conventional structure.

The shear plates 14 forming the subject matter of the present invention are substantially triangular in formation and include front and side walls 15 and 16 respectively, the front and side walls extending at right angles with respect to each other. The upper and lower surfaces of the shear plates are spaced apart a distance equal to the thickness of the bars 6, so that the extended flanges indicated by the reference character 17, will overlie the bars 6, providing a close fit between the shear plates and the bars 6. A brace bar 18 forms a part of each shear plate and is disposed between the upper and lower surfaces of the shear plate further bracing the shear plates.

Secured to the upper surfaces of the bars 6, are deflector plates 19 that have their forward ends inclined at 20 which are engaged by the inclined ends 21 of the shear plates, causing the shear plates to be extended laterally under an intense force which would shear the bolts 22 that secure the shear plates to the bars 6. The vehicle bumper which is indicated by the reference character 23 is secured to the shear plates 14 by the brackets 24 that are welded or otherwise secured to the front walls 15 of the shear plates, as clearly shown by Fig. 1 of the drawings.

The openings 25 that receive the bolts 22, are elongated to various lengths so that upon movement of the shear plates longitudinally of the bars 6, under varying degrees of force, the bolts will be successively sheared off depending on the amount of force directed to said shear plates. It is obvious that as these shear plates move rearwardly, they will be directed laterally by contact of the ends 21 with the inclined ends 20 of the deflector plates, separating the shear plates from the bars 6. Openings 26 are formed in the brace bars 18 of the shear plates which openings 26 are also elongated to various lengths longitudinally of the shear plates to accommodate bolts 27 that also extend through openings in the bars 6, the bolts 27 being of the shear type to the end that an unusual force directed to the shear plates will shear the bolts 27 to release the shear plates, causing the shear plates to move laterally, away from the frame of the machine or dissipating the major portion of the force incident to the vehicle contacting a stationary object or vehicle with which the bumper of the vehicle equipped with the shear plates, may contact as the result of a collision.

The spindles 29 of the front wheels are supported by the pivoted arms 31 and 32 which are pivotally connected to the shear plates at 33. The usual vertical coiled springs 34 are provided in the front wheel assemblies of the vehicle and are of a conventional structure.

As shown by sheet 2 of the drawings, the reference character 35 indicates the brake fluid line which connects with the pipe 36 that in turn connects with the master cylinder 37 of the fluid brake system.

The reference character 38 indicates a pipe which forms a part of the usual fluid brake system, and leads to the brake cylinder of the front wheel of the vehicle. This pipe 38 connects with the pipe 39 which also forms a part of the fluid pipe line that connects with the pipe 38.

A valve indicated by the reference character 40 is mounted in the pipe line between the brake cylinders of the front wheels and the master cylinder 37, the valve 40 being of the rotary type. An arm 41 connects with the valve 40 and affords means for effecting rotation of the valve to move the valve to a closed position to cut off the flow of brake fluid to the brake cylinders of the front wheels of the vehicle, allowing the rear wheels to operate to brake the vehicle.

Connected with the arms 41 is a cable 42 that passes through brackets 43 that act as guides for the cable 42, the end of the cable 42 being connected to the shear plate 14 at the left front end of the vehicle.

Connected with the cable 42 is the cable 44 at the front end of the vehicle, which connects with the shear plate 14 at the right hand side of the vehicle.

It is obvious that under normal conditions, the valve 40 will be open, in which case the valve will take the position as shown by Fig. 4.

As the shear plates move rearwardly, it is obvious that the cables connected thereto will be stretched or pulled to operate the valve 40 to move the valve 40 to its closed position, cutting off the passage of brake fluid from the brake line, to render the brakes inoperative at the front of the vehicle.

From the foregoing it will be seen that mechanism has been provided for cutting off the flow of brake fluid through front pipes of the brake system to the end that the rear brakes of the system may still be operated to brake the vehicle.

Due to the construction shown and described, I have provided shear plates that form supports for the front wheel assemblies of a motor vehicle as well as a support for the bumper of the vehicle, so that in the event that the bumper of the vehicle equipped with shear plates, meets with an obstruction of unusual force, the bolts connecting the shear plates with the bars of the frame, will be sheared off and a glancing blow will be directed to the frame, instead of a direct blow, as would be the result if the bumper of the vehicle were secured to a straight or rigid transverse bar such as indicated by the reference character A of the vehicle chassis.

Having thus described the invention, I claim:

1. A brake element for use in a motor vehicle frame which includes forwardly converging bars fixed at their rear divergent ends to said frame, a pair of shear members secured to and extending laterally of said bars, each shear member comprising upper and lower triangular plates, right angularly related connecting members fixed between said plates, a connecting bar fixed between said plates and connected to the ends of said connecting members, said connecting bar being disposed inwardly from the base line of each plate to thereby provide relatively wide flanges for engagement over the upper and lower sides of said converging bars, said flanges having elongated openings, and frangible bolts extending through said openings and said converging bars.

2. A brake element for use in a motor vehicle frame which includes forwardly converging bars fixed at their rear divergent ends to said frame, a pair of shear members secured to and extending laterally of said bars, each shear member comprising upper and lower triangular plates, right angularly related connecting members fixed between said plates, a connecting bar fixed between said plates and connected to the ends of said connecting members, said connecting bar being disposed inwardly from the base line of each plate to thereby provide relatively wide flanges for engagement over the upper and lower sides of said converging bars, said flanges having elongated openings, frangible bolts extending through said openings and said converging bars, each flange having an obtusely angled rear end, and obtusely angled deflector members fixed to said converging bars and bearing against the rear ends of said flanges to thereby effect lateral movement of said shear members with rearward movement thereof.

References Cited in the file of this patent

UNITED STATES PATENTS

| | | |
|---|---|---|
| 2,001,093 | Cherpes | May 14, 1935 |
| 2,401,748 | Dillon | June 11, 1946 |
| 2,519,429 | Brandvold | Aug. 22, 1950 |
| 2,557,105 | Hight | June 19, 1951 |
| 2,776,695 | Wells | Jan. 8, 1957 |